United States Patent
Wiand et al.

[11] Patent Number: 5,802,939
[45] Date of Patent: Sep. 8, 1998

[54] TABLE TOP BAND SAW

[76] Inventors: Richard K. Wiand, 1023 Yarmouth Rd., Bloomfield Hills, Mich. 48301; Dennis Buschmohle, 18306 Millar, Clinton Township, Mich. 48036

[21] Appl. No.: 683,245

[22] Filed: Jul. 18, 1996

[51] Int. Cl.$^6$ ............ B23D 55/10; B23D 59/04; B26D 1/48; B27B 13/00
[52] U.S. Cl. ............... 83/169; 83/817; 83/818; 83/820; 83/859
[58] Field of Search .............. 83/817, 818, 819, 83/169, 816, 820, 859, 814

[56] References Cited

U.S. PATENT DOCUMENTS

| | | | |
|---|---|---|---|
| 501,554 | 7/1893 | Wilson . | |
| 1,038,328 | 9/1912 | Ensign . | |
| 2,380,700 | 7/1945 | Lasar | 83/818 X |
| 2,395,237 | 2/1946 | Swenson | 83/819 X |
| 2,525,004 | 10/1950 | Spang | 83/817 X |
| 2,529,249 | 11/1950 | Flood . | |
| 2,664,118 | 12/1953 | Krumbach | 83/818 X |
| 2,815,562 | 12/1957 | Wilkie et al. . | |
| 2,825,369 | 3/1958 | Karp et al. . | |
| 2,978,001 | 4/1961 | Whisler . | |
| 3,034,387 | 5/1962 | Sebastian . | |
| 3,104,575 | 9/1963 | Robinson . | |
| 3,104,576 | 9/1963 | Robinson . | |
| 3,208,487 | 9/1965 | Aja . | |
| 3,259,004 | 7/1966 | Chisholm . | |
| 3,479,097 | 11/1969 | McLauchlan et al. . | |
| 3,485,123 | 12/1969 | Komendowski . | |
| 3,508,590 | 4/1970 | Sprague, Sr. . | |
| 3,557,848 | 1/1971 | Wright . | |
| 3,673,903 | 7/1972 | Evans . | |
| 3,733,952 | 5/1973 | Fukugami et al. | 83/818 X |
| 3,889,564 | 6/1975 | Aspinwall et al. . | |
| 3,961,550 | 6/1976 | Oliver et al. . | |
| 4,001,937 | 1/1977 | Stelljes et al. . | |
| 4,050,339 | 9/1977 | Soleri | 83/818 X |
| 4,212,104 | 7/1980 | Wikoff . | |
| 4,237,757 | 12/1980 | Bonac . | |
| 4,318,323 | 3/1982 | Voorhees et al. . | |
| 4,386,545 | 6/1983 | Chaconas . | |
| 4,501,181 | 2/1985 | Yakich . | |
| 4,592,261 | 6/1986 | Miyaji et al. . | |
| 4,622,748 | 11/1986 | Binder et al. . | |
| 4,677,887 | 7/1987 | Martin . | |
| 4,960,026 | 10/1990 | Terpstra . | |
| 5,345,850 | 9/1994 | Neitzell . | |
| 5,383,443 | 1/1995 | Buyens . | |
| 5,439,740 | 8/1995 | Gat . | |

FOREIGN PATENT DOCUMENTS

| | | | |
|---|---|---|---|
| 2386397 | 12/1978 | France | 83/817 |

*Primary Examiner*—Clark F. Dexter
*Attorney, Agent, or Firm*—Harness, Dickey & Pierce, P.L.C.

[57] ABSTRACT

A table top band saw that is almost entirely assembled of molded plastic components to provide for ease of manufacture and assembly. The band saw includes a plastic housing enclosing a pair of opposed plastic wheels that are configured to allow for rotation of an endless saw blade. A plastic work table is secured to the housing such that the saw blade travels through the table and provides a location for supporting and sawing a work piece. An extended blade guide including a metal insert, is secured to the table to provide stabilization of the blade at the location where the work piece is being cut. A stabilizer and water feed device is positioned above the table, and allows a cooling fluid to flow onto the blade without dripping. A single piece plastic blade tensioning device is secured to posts extending from the housing adjacent to a top wheel. The blade tensioning device includes a shaft on which the top wheel is rotatably secured. Two spring elements are positioned on the posts between the blade tensioning device and the housing so as to provide a spring bias tension for the position of the top wheel. An adjustment on the blade tensioning unit sets a tilt orientation of the top wheel so as to provide the blade tracking.

23 Claims, 6 Drawing Sheets

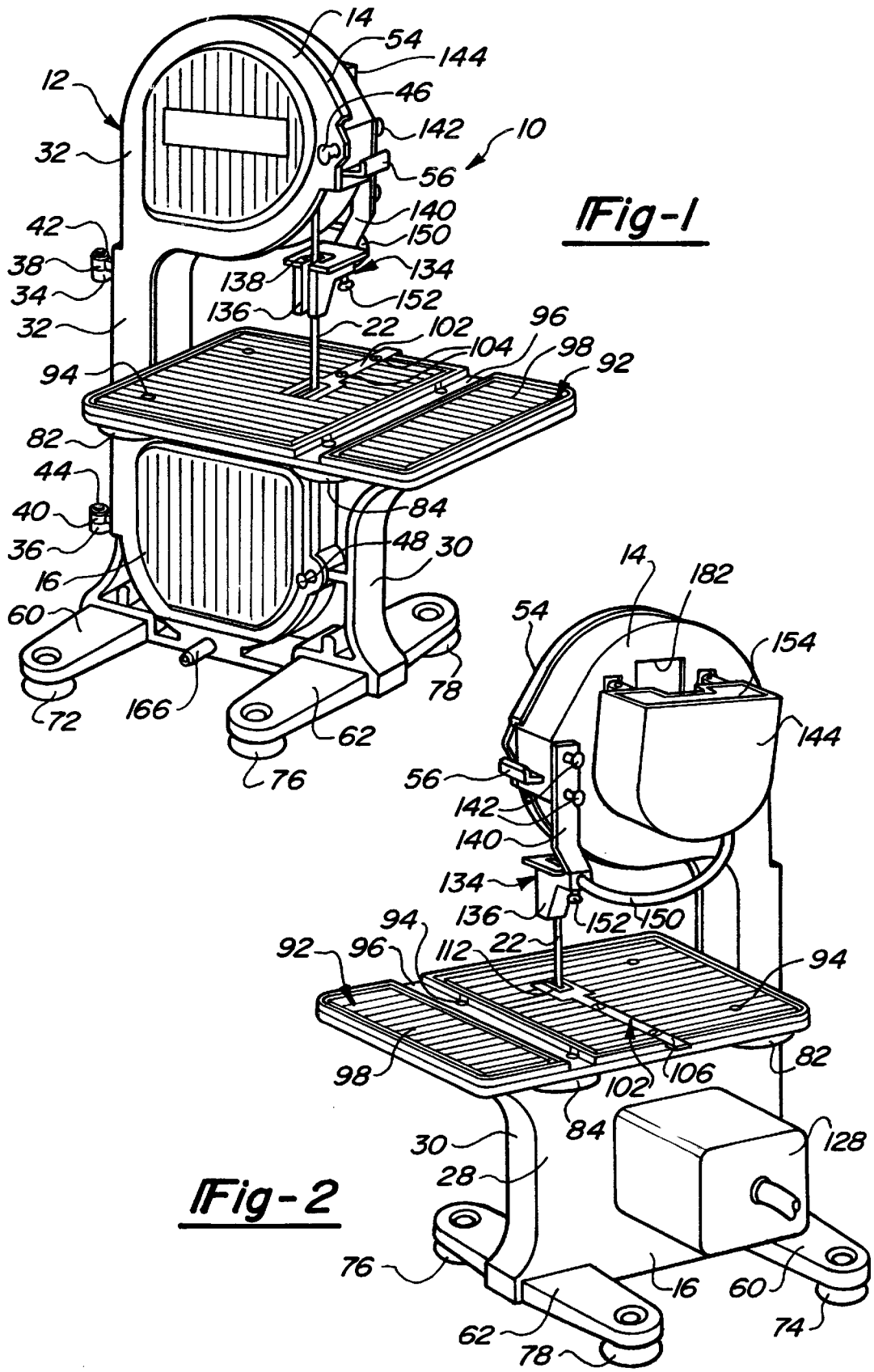

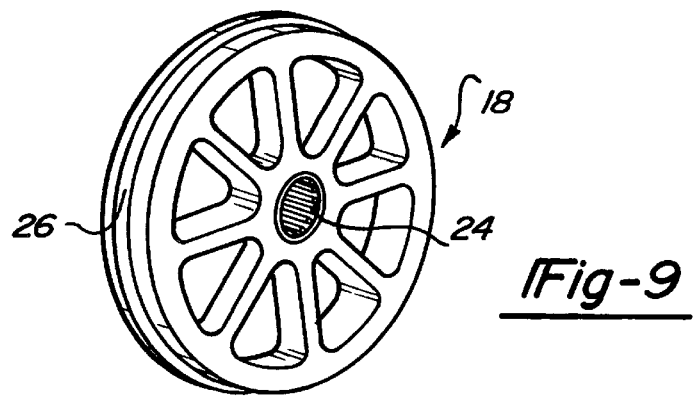
Fig-9
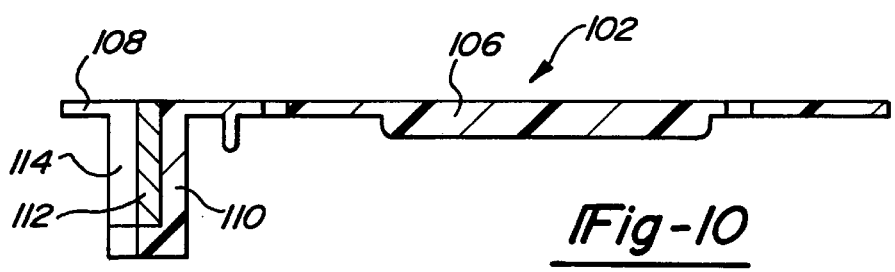
Fig-10
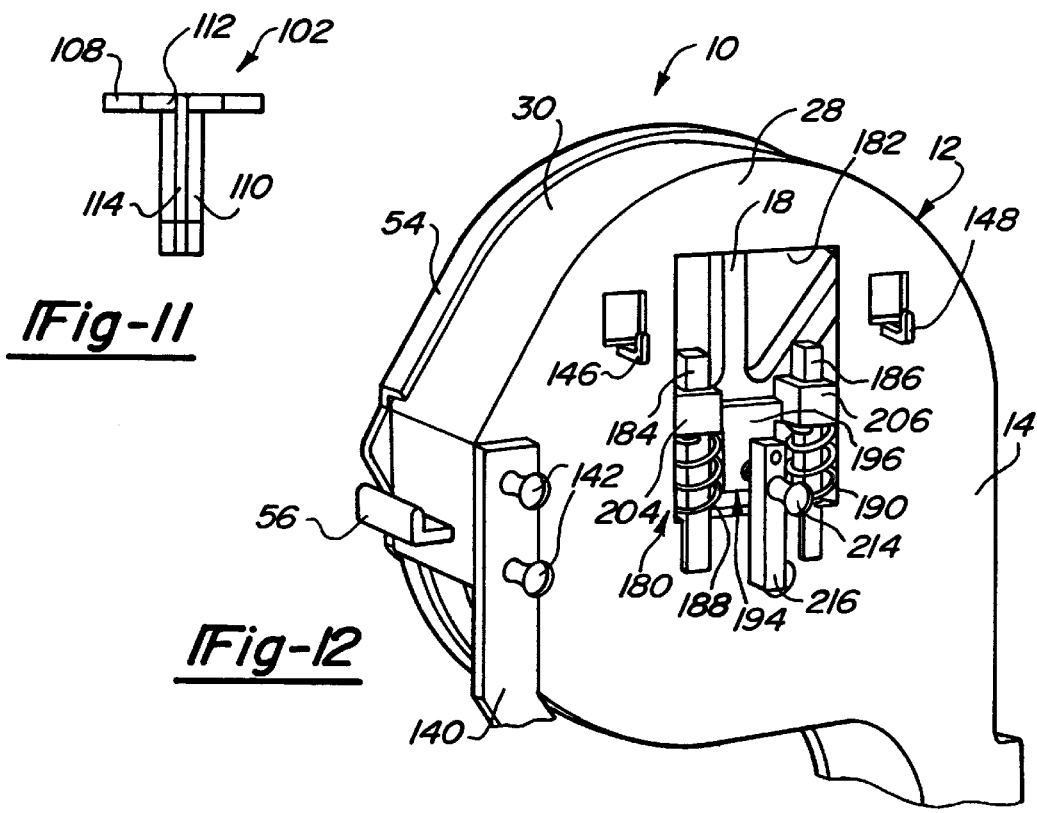
Fig-11
Fig-12

TABLE TOP BAND SAW

BACKGROUND OF THE INVENTION

1. Field of the Invention

This invention relates generally to a table top band saw and, more particularly, to a table top band saw assembled almost entirely of molded plastic components and including various features that make it durable and inexpensive to manufacture.

2. Discussion of the Related Art

Table top band saws are available to cut a wide variety of different materials, such as glass, wood, ceramic, metals, plastics, stone, silicon wafers, etc., for many different applications. Users of such band saws include hobbyists, artists, woodworkers, etc. Typically, these types of table top band saws include a pair of opposed wheels secured within a housing that act to position and rotate an endless saw blade. The saw blade runs through a table top positioned between the wheels such that a work piece can be supported on the table top relative to the saw blade for cutting. An electric motor rotates one of the wheels, causing the saw blade to rotate in a sawing operation.

Band saws of this type are generally not manufactured with a saw blade lubrication and cooling system. However, some materials do require coolant to cut properly. For example, when cutting wood, the cutting operation can generally be performed under dry conditions. When cutting stone, glass, ceramic, etc., a cooling fluid is generally required to provide lubrication, reduce heat, and wash away residue. Therefore, it has been known to retrofit dry cutting band saws with a cooling system that applies water to the saw blade during cutting. Since the band saw was not originally designed to provide cooling, a number of problems can exist. For example, the motor can be exposed to the cooling water.

Known band saws are an assembly of many different components. The structural configuration of the assembly of components that make up the saw are meant to stand up to the rigors of the sawing process for the materials they were intended to cut. Typically, most of the components of the known table top band saws are metal components to provide the desired stability and durability. Thus, the known band saws are limited by the manufacturing processes necessary to shape, cut, assemble, etc. the metal components to manufacture the band saws.

Additionally, table top band saws of the type being described herein generally include a tensioning device that provides blade tensioning and appropriate tracking of the saw blade on the wheels. These blade tensioning devices are also an assembly of many different components to provide the desired function. Thus, the blade tensioning devices are complex in both design and assembly.

The known table top band saws have generally been successful in meeting their intended function. However, there is still room for improvement of these saws that allow for simplicity of design, ease of manufacture, reduction of the number of components, improvement of materials, etc. It is an object of the present invention to provide a table top band saw that has a number of advantages over the known table top band saws in the art.

SUMMARY OF THE INVENTION

In accordance with the teachings of the present invention, a table top band saw is disclosed that is almost entirely assembled of molded plastic parts to provide for ease of manufacture and assembly. The band saw includes a plastic housing enclosing a pair of opposed plastic wheels that are configured to allow for rotation of an endless saw blade. A plastic work table is secured to the housing such that the saw blade travels through the table and provides a location for supporting and sawing a work piece. An extended blade guide, including a metal insert, is secured to the table to provide stabilization of the blade at the location where the work piece is being cut. A stabilizer and water feed device is positioned above the table, and allows a cooling fluid to flow onto the blade without dripping. The interior of the housing is designed such that lubricant and swarf on the blade that drips into the housing is directed to a drain port at the bottom of the housing.

A single plastic piece blade tensioning unit is secured to posts extending from the housing adjacent to a top wheel of the saw. The top wheel is rotatably mounted to a shaft integral with the tensioning unit. One or more spring elements are positioned on the posts between the blade tensioning unit and the housing, so as to provide a spring bias tension for the position of the top wheel. An adjustment on the blade tensioning unit sets a tilt orientation of the top wheel so as to provide blade tracking.

Additional objects, advantages and features of the present invention will become apparent from the following description and appended claims, taken in conjunction with the accompanying drawings.

BRIEF DESCRIPTION OF THE DRAWINGS

FIG. 1 is a front perspective view of a table top band saw according to an embodiment of the present invention;

FIG. 2 is a back perspective view of the saw shown in FIG. 1;

FIG. 9 is a perspective view of one of the band saw wheels shown in FIG. 7;

FIG. 10 is a side view of a blade guide separated from a work table of the band saw shown in FIG. 1, according to an embodiment of the present invention;

FIG. 11 is a front view of the blade guide shown in FIG. 10;

FIG. 12 is a perspective view of a tensioning system of the band saw shown in FIG. 1, according to an embodiment of the present invention;

DETAILED DESCRIPTION OF THE PREFERRED EMBODIMENTS

Figure 3:
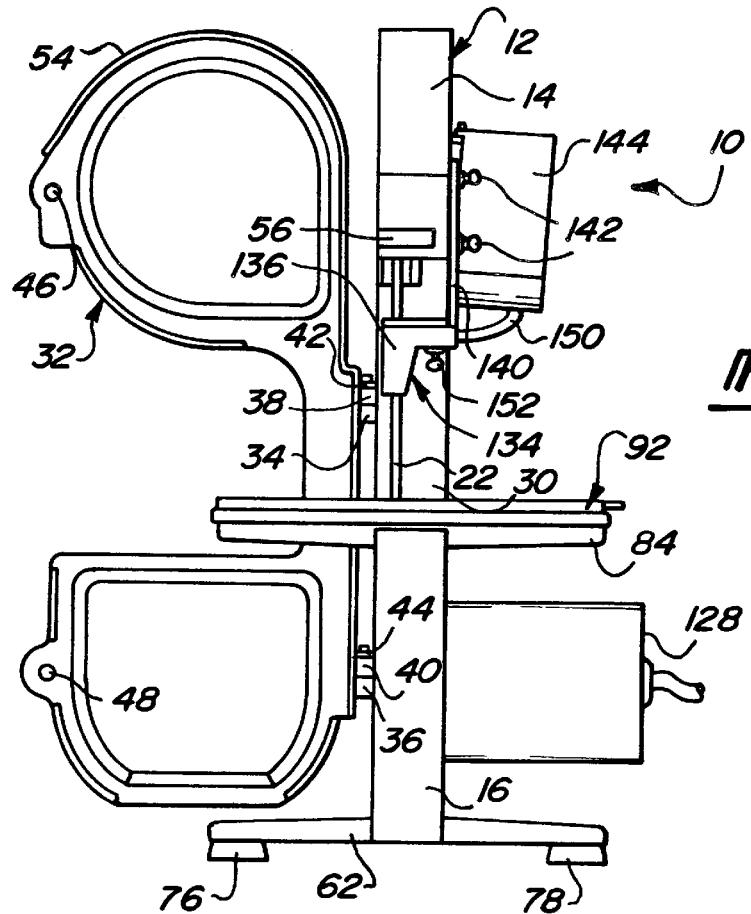
FIG. 3 is a side view of the band saw shown in FIG. 1 with a housing door open.
Figure 4:
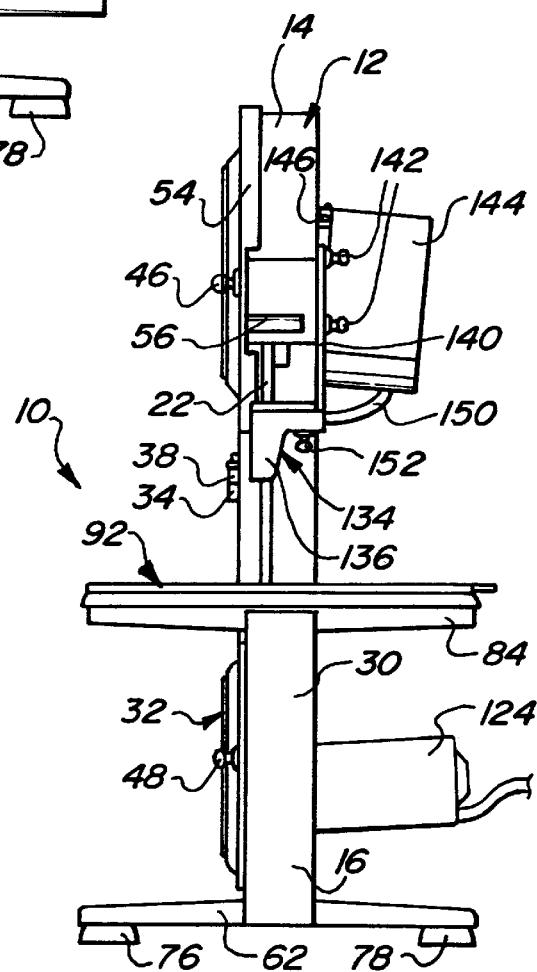
FIG. 4 is the side view of the band saw shown in FIG. 3 with the housing door closed and a motor housing removed.
Figure 5:
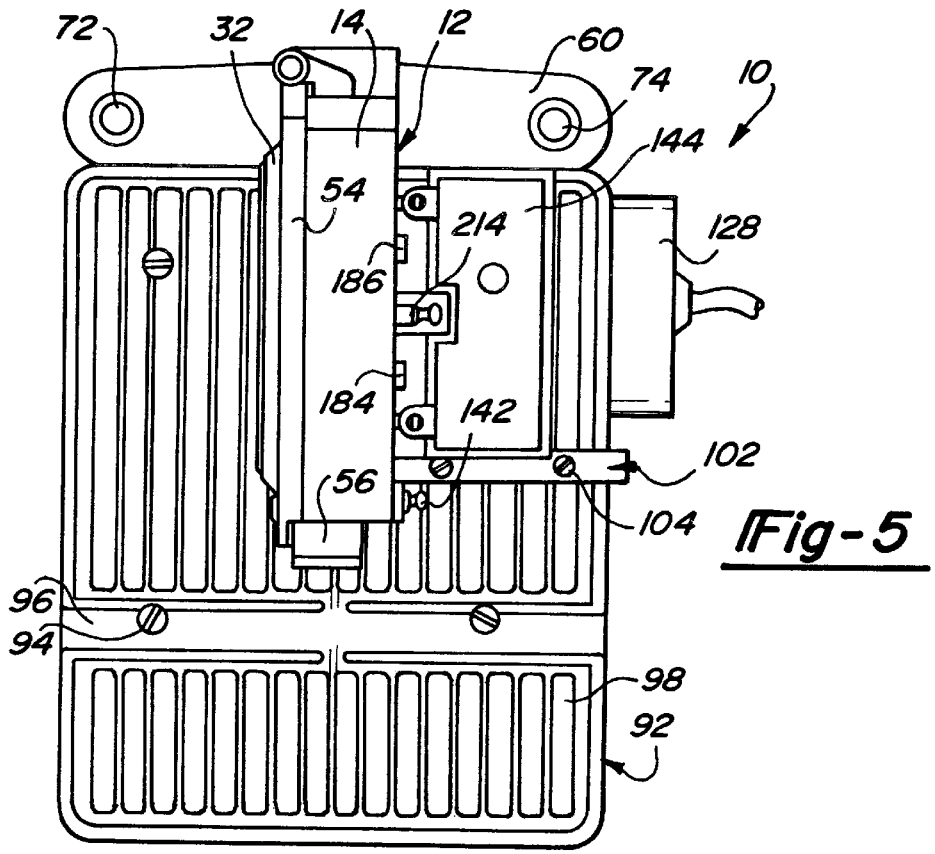
FIG. 5 is a top view of the band saw shown in FIG. 1.
Figure 6:
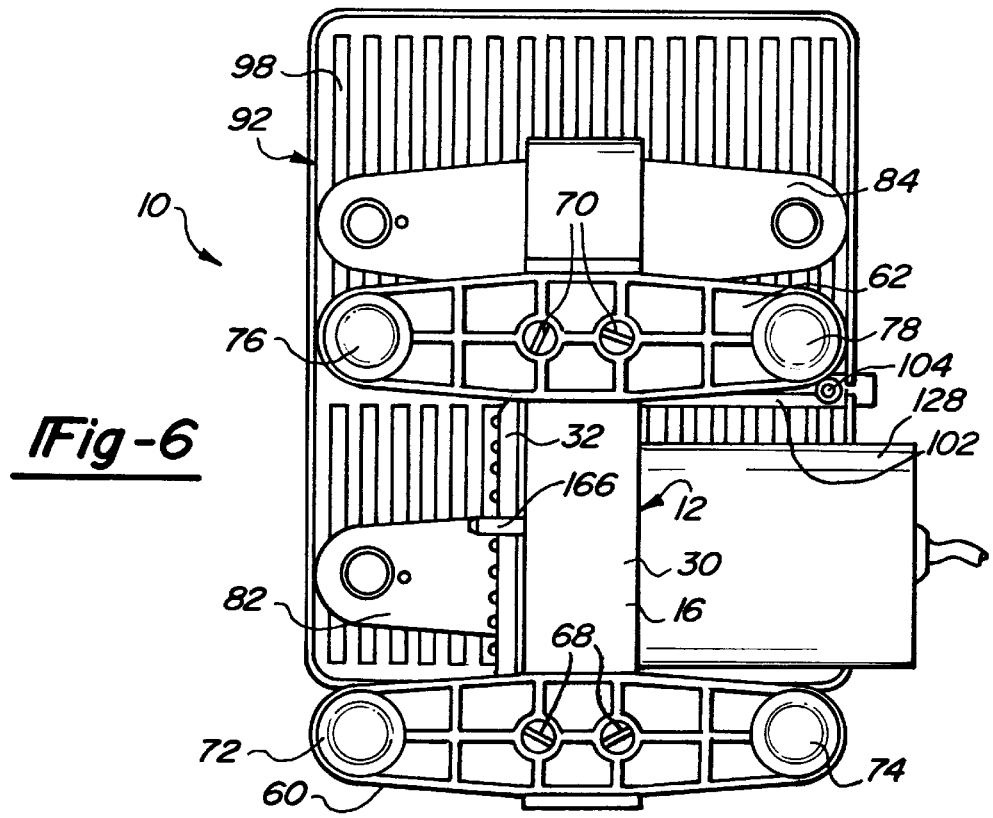
FIG. 6 is a bottom view of the band saw shown in FIG. 1.

The following description of the preferred embodiments directed to a table top band saw is merely exemplary in nature and is in no way intended to limit the invention or its applications or uses.

FIGS. 1–8 show various views of a table top band saw 10, according to an embodiment of the present invention. As will be discussed below, the band saw 10 can either operate in a wet or dry sawing process to cut a variety of different materials, such as glass, wood, ceramic, non-ferrous metals, plastic, stone, etc. The band saw 10 is an assembly of parts where almost all of the parts are injection molded plastic pieces made of a highly durable plastic, for example an expanded structural ABS or polystyrene plastic. This durable plastic stands up to the rigors of the sawing operation, and provides for easy clean up using common detergents. The individual components are easily disassembled and reassembled for cleaning, storage, etc. The individual plastic components allow for a reduction in weight, ease of manufacture, reduction in cost, and ease of assembly over known table top band saws of the type known in the art.

The band saw 10 includes a C-shaped plastic housing 12 having an upper housing portion 14 and a lower housing portion 16. An upper wheel 18 is rotatably mounted in the upper housing portion 14, and a lower drive wheel 20 is rotatably mounted in the lower housing portion 16. The lower housing portion 16 includes various structural features that give the band saw 10 rigidity and structural integrity. An endless saw blade 22 is positioned around the wheels 18 and 20, as shown, and upon rotation of the wheels 18 and 20 is caused to travel in an elliptical motion in a sawing operation. The saw blade 22 can be any suitable saw blade for the purposes described herein, such as an endless strip of steel having an electroplated edge of abrasive diamond grit, and can be interchangeable with other known saw blades to cut different materials. FIG. 9 shows a perspective view of the wheel 18 removed from the housing 12, with the understanding that the lower wheel 20 is identical. The wheel 18 is a single piece injection molded plastic wheel with a center opening 24 for accepting a support shaft. An outside edge of the wheel 18 includes a lip 26 for preventing the saw blade 22 from falling behind the wheel 18 during operation.

Figure 7:
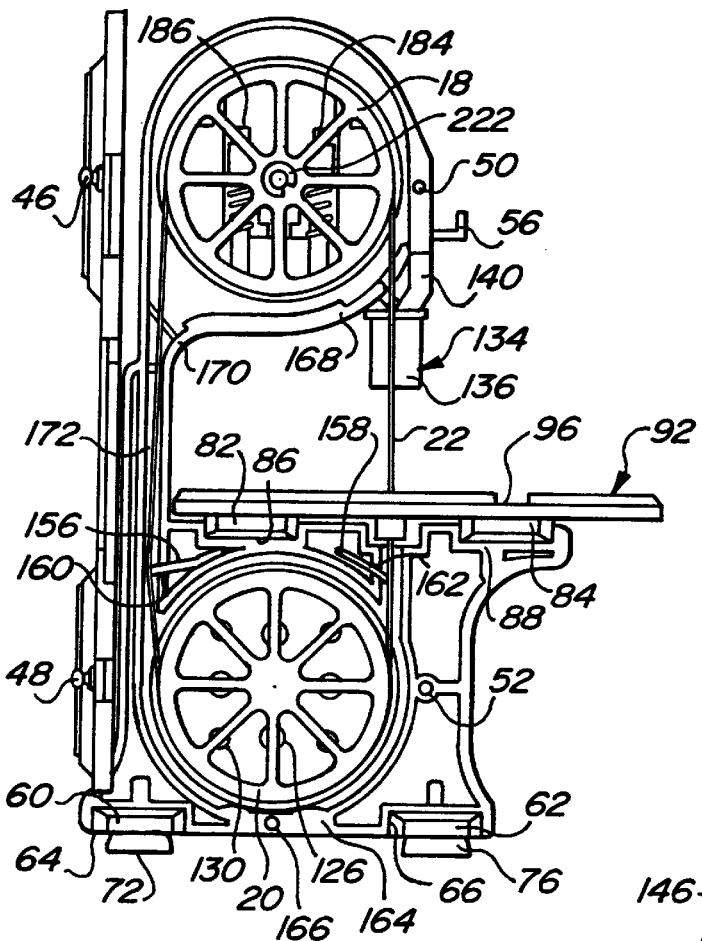
FIG. 7 is a front view of the band saw shown in FIG. 1 with the housing door open to expose the interior of the band saw.
Figure 8:
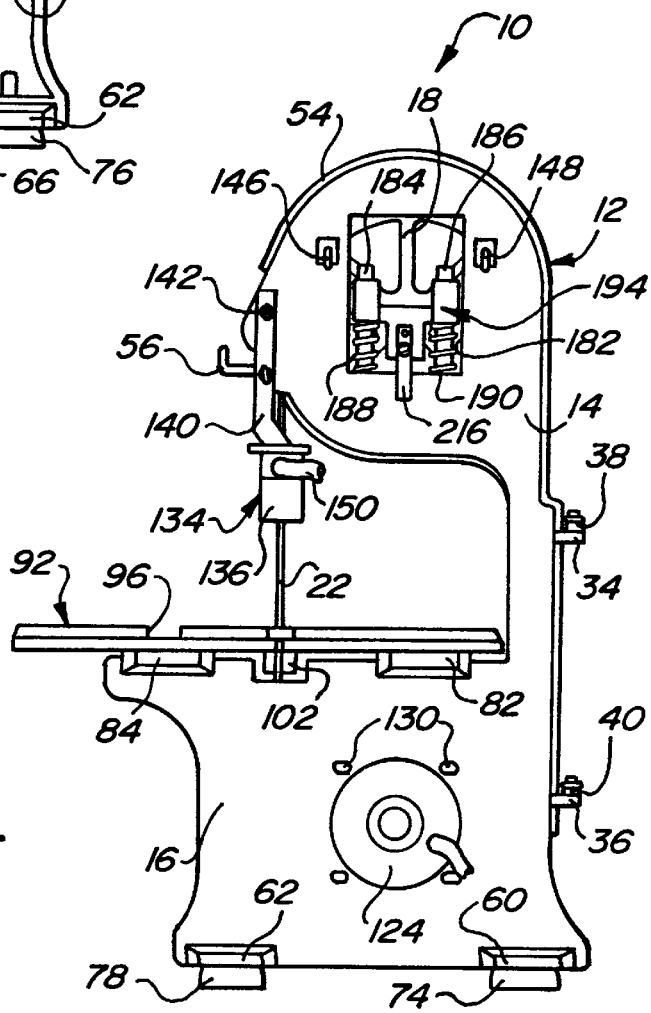
FIG. 8 is a back view of the band saw shown in FIG. 1 with the motor housing and a coolant reservoir removed.

The housing 12 includes a single piece integrally molded back panel 28 and side wall 30. A C-shaped plastic door panel 32 is pivotally secured to the side wall 30 so that the door panel 32 can be opened to expose the interior of the housing 12 and the wheels 18 and 20, as shown in FIGS. 3 and 7. The pivotal engagement between the side wall 30 and the door panel 32 is provided by first and second hinge pins 34 and 36, being an integral part of the side wall 30, that engage first and second bushings 38 and 40, respectively, being an integral part of the door panel 32, such that the bushings 38 and 40 rotate on the pins 34 and 36. Clips or O-rings 42 and 44 hold the bushings 38 and 40 on the pins 34 and 36. A pair of screws 46 and 48 secured to the door panel 32 are threadably engageable with threaded brass bushings 50 and 52, respectively, so that the door panel 32 can be secured to the side wall 30 in a closed configuration. A circumferential lip 54 extends around the perimeter of the door panel 32, and is positioned adjacent to the wall 30 when the door panel 32 is in a closed position. A hook member 56 extends from the side wall 30 and is integrally molded therewith. The hook member 56 provides a place for securing accessories to the band saw 10, such as a protective shield (not shown), a light (not shown), etc.

The housing 12 is stabilized on a table by a pair of separately molded plastic stabilizing members 60 and 62 positioned perpendicular to the orientation of the housing 12. The stabilizing members 60 and 62 are secured within channels 64 and 66, respectively, at a bottom surface of the lower housing portion 16 by two pairs of bolts 68 and 70, as shown. The stabilizing member 60 includes a pair of rubber feet 72 and 74, and the stabilizing member 62 includes a pair of rubber feet 76 and 78, so as to provide a cushioned, anti-skid contact with a table (not shown) on which the saw 10 is positioned.

A second pair of plastic stabilizing members 82 and 84 are secured within channels 86 and 88, respectively, at a top surface of the lower housing portion 16 by bolts (not shown), in the same manner as the stabilizing members 60 and 62. In one embodiment, the stabilizing members 82 and 84 are the same molded parts as the stabilizing members 60 and 62, without the rubber feet 72, 74, 76 and 78, to provide for simplicity of manufacture. A separately molded plastic work table 92 is secured to the stabilizing members 82 and 84 by a series of bolts 94. The stabilizing members 82 and 84 support and stabilize the work table 92 against the rigors of cutting on the table 92. A slot 96 is molded into the work table 92 to provide a securing slot for a protractor (not shown) to provide angled cuts, as is well understood in the art. The table 92 includes a plurality of parallel ribs 98 that act to channel away cooling fluid from the table 92 during operation.

A plastic blade guide 102 is secured in the table 92 by a pair of bolts 104, and is thus easily removable therefrom. FIG. 10 shows a cross-sectional side view of the blade guide 102 and FIG. 11 shows a front view of the blade guide 102, removed from the table 92. The blade guide 102 includes an elongated top surface portion 106 attached to a wide top surface portion 108. An elongated guide portion 110 extends down from the wide top portion 108, and is substantially perpendicular to a top surface of the work table 92. The elongated top surface portion 106, the wide top surface portion 108, and the guide portion 110 are a single molded plastic piece. An opening is molded into the wide top portion 108 and the guide portion 110, to accept a metal insert 112 in a friction fit engagement. The blade 22 passes through an opening 114 in the metal insert 112 so as to allow the saw blade 22 to travel through the table 92. The blade guide 102 provides blade guiding and support capabilities at the location where the work piece is being cut, and therefore allows the work piece to be turned during cutting without the blade 22 turning. The result is the ability to cut small radii, with better control, and more accurate sawing guidelines. The metal insert 112 reduces wear on the blade guide 102, and thus extends the usable life of the blade guide 102. In one embodiment, the metal insert 112 is made of steel or brass.

An electric motor 124 is secured to the back panel 28 proximate the center of the lower portion 16 of the housing 12 by a plurality of bolts 126. A removable plastic motor housing 128 is secured to the back panel 28 by openings 130 to cover the motor 124, to keep the motor 124 dry and provide a more pleasingly appearance. In one embodiment, the motor 124 is a 115 volt 50/60 hertz 0.5 amp Flowjet motor, known to those skilled in the art. A motor shaft (not shown) of the motor 124 extends through the back wall 28 into the lower housing portion 16. The lower wheel 20 is rigidly secured to the motor shaft such that when the shaft rotates, the wheel 20 rotates. Rotation of the wheel 20 causes the saw blade 22 to rotate, which in turn causes the upper wheel 18 to rotate. The motor 124 is oriented at about a 3°–5° angle relative to the back panel 28 such that the lower wheel 20 is angled slightly relative to the blade 22 to provide better tracking of the blade 22 on the wheel 20. The tilt of the wheel 20 is such that a top portion of the wheel 20 is more forward than a bottom portion of the wheel 20. In other words, the motor shaft is angled down. This position of the motor 124 cambers the lower wheel 20 and improves tracking of the blade 22.

A blade guide and water feed device 134 is secured to a lower location of the upper housing portion 14, as shown. The water feed device 134 includes a blade stabilizing portion 136 through which the blade 22 travels. The stabilizing portion 136 includes a metal insert 138 that reduces wear on the stabilizing portion 136 from the movement of the blade 22. The water feed device 134 is secured to the back wall 28 by an arm member 140 and a pair of screws 142 to hold the water feed device 134 in place, and is easily removable therefrom. A plastic coolant reservoir 144 is attached to the back panel 28 of the upper housing portion 14 by a pair of integrally molded hooks 146 and 148. A hose 150 attached to a bottom opening of the reservoir 144 is connected to a hose clamp 152 on the stabilizing portion 136. A flow of coolant is gravity fed from the reservoir 144 and is controlled by the hose clamp 152 so as to control the amount of fluid applied to the blade 22. Usually, water is the coolant, and is put in the reservoir 144 through an open upper end 154. The hose 150 is inserted into the stabilizing portion 136 behind the saw blade 22 so the coolant coats the blade 22 regardless of how restricted the coolant flow is, and prevents the coolant from dripping wastefully onto the table 92.

Because the blade 22 is lubricated when cutting some materials, cooling fluid and swarf will drop and be spun off from the blade 22 at many locations in its travel. A pair of wipers 156 and 158 are secured at a strategic location within the lower housing portion 16 such that the wipers 156 and 158 contact the blade 22, as shown. The wipers 156 and 158 wipe fluid and swarf from the blade 22 such that it falls down into a bottom area of the lower housing portion 16. In one embodiment, the wipers 156 and 158 are leather strips secured within channels 160 and 162 within the lower housing portion 16 so as to be removable and replaceable. A collection area is defined by a wall 164 at the bottom of the lower housing portion 16 to collect the swarf and cooling fluid. An outlet port 166 allows the collection area to be drained, and can be connected to a suitable hose (not shown) to be drained to a sink location or the like.

The housing 12 includes many lips and angles that direct coolant into the outlet port 166. For example, edges 168 and 170 of the side wall 30 at the upper housing portion 14 are so defined and configured that cooling fluid and swarf that drops from the blade 22 travels down a channel 172 into the collecting area.

In order to provide suitable tension on the blade 22 during operation so as to help prevent blade breakage during cutting, and provide ease of blade replacement, a tensioning system 180 is provided. FIG. 12 shows a perspective view of the tensioning system 180. The back panel 28 of the upper portion 14 includes a rectangular opening 182. A pair of side-by-side spring posts 184 and 186 are integrally molded with the back panel 28 and stick up into the opening 182, as shown. In this embodiment, the posts 184 and 186 have a square configuration, but as will be appreciated by those skilled in the art, the posts 184 and 186 can take on other geometrical configurations and still achieve the purposes of the present invention. A pair of metal springs 188 and 190 are slid onto the posts 184 and 186, respectively, to provide the tensioning.

Figure 13:
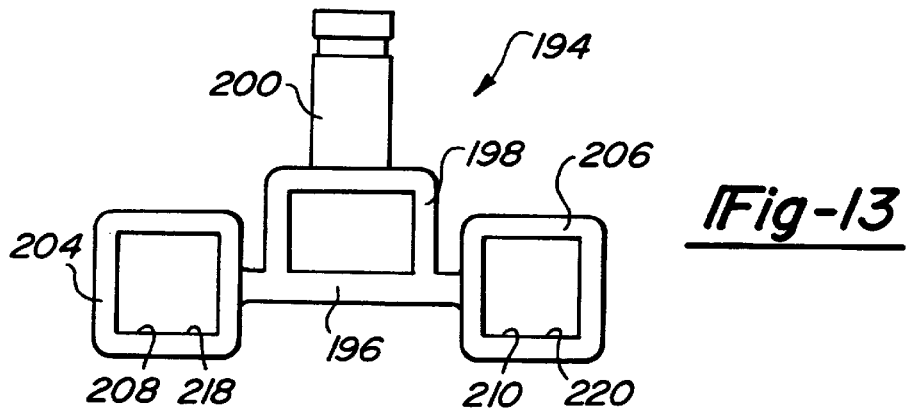
FIG. 13 is a top view of a tensioning device of the tensioning system shown in FIG. 12.
Figure 14:
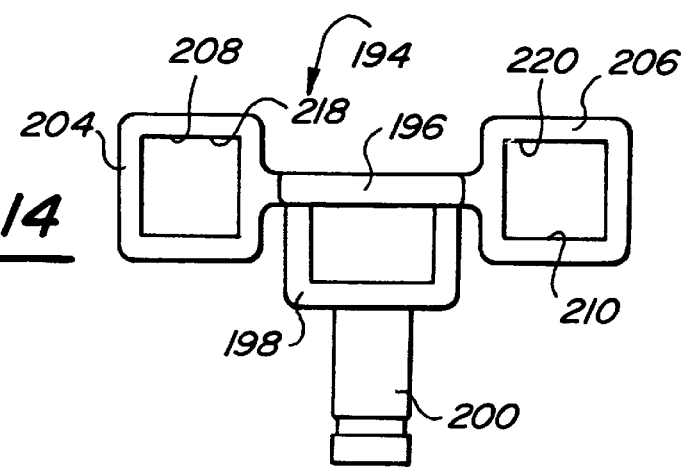
FIG. 14 is a bottom view of the tensioning device shown in FIG. 13.
Figure 15:
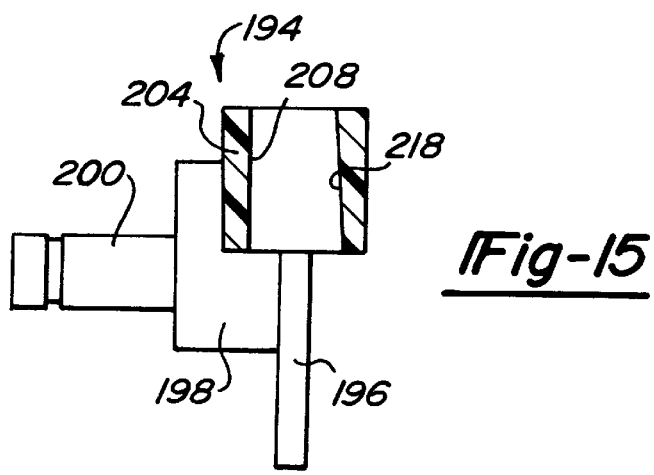
FIG. 15 is a partial cut-away side view of the tensioning device shown in FIG. 13.

A single piece plastic tensioning device 194 is also slidably engaged onto the posts 184 and 186 and is positioned within the opening 182, as shown. A series of views of the tensioning device 194 are shown in FIGS. 13–15 removed from the band saw 10. The tensioning device 194 includes a base portion 196 having an extended hollow support portion 198. A shaft 200 extends from the support portion 198 into the upper housing portion 14. The wheel 18 is releasably connected to the shaft 200 by a metal securing clip 222 secured within a circumferential slot in the shaft 200, such that the wheel 18 is free to rotate on the shaft 200. A pair of wing portions 204 and 206 are connected to the base member 196, and include rectangularly configured openings 208 and 210, respectively. The posts 184 and 186 are inserted into the openings 208 and 210, respectively, such that the tensioning device 194 is slidably mounted to the housing 12 within the opening 182. The rectangular configuration of the posts 184 and 186 and the openings 208 and 210 prevent the tensioning device 194 from twisting. Of course, other geometric configurations can also be used to achieve this same function. Also, it is not necessary to use two posts, in that a single post may also be satisfactory. The support portion 198 can be slid onto an appropriately configured post, for example.

Downward pressure on the tensioning device 194 against the bias of the springs 188 and 190 causes the tensioning device 194 to slide downward on the posts 184 and 186 and the wheel 18 to move downward towards the table 92. Thus, if the blade 22 binds on a work piece during cutting, or is forcibly moved in a sideways direction in some manner, the wheel 18 will move against the bias of the springs 188 and 190, and help prevent the blade 22 from breaking. Also, downward pressure on the wheel 18 or the device 194 will allow for ease of replacement of the blade 22 with a new blade, or another blade suitable for a different cutting purpose.

Blade tracking to ensure that the blade 22 is properly aligned on the wheel 18 is of significant concern for band saws of this type. It is desirable that the blade 22 be maintained on the wheel 18 in a suitable position to prevent slippage, and the like. To provide for blade tracking, a tracking adjustment screw 214 is provided that is threadably engaged through a tracking post 216 integrally molded with the back panel 28 between the posts 184 and 186, as shown. The screw 214 contacts a back surface of the base member 196 and applies pressure thereto depending on the amount that the screw 214 is threaded through the post 216. An internal back wall 218 of the opening 208 and an internal back wall 220 of the opening 210 are angled such that pressure at the area of the base member 196 adjacent to the screw 214 causes the tensioning device 194 to pivot slightly forward and backward relative to the posts 184 and 186. This pivoting causes the wheel 18 to tilt slightly, thus adjusting the position of the blade 22 on the wheel 18. In one embodiment, the degree of angle of the back walls 218 and 220 is between 2 and 10 degrees depending on the application.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A band saw for cutting a work piece, said band saw comprising:

a housing having an upper housing portion and a lower housing portion, said housing including a back panel, a side panel and a door panel, said door panel being pivotally secured to the side panel, said back panel having an opening therein and, said housing further including at least one post member connected to the back panel at the periphery of the opening and extending within the opening of the back panel;

first and second wheels, said first wheel being rotatably mounted within the upper housing portion and said second wheel being rotatably mounted within the lower housing portion;

a work table secured to the lower housing portion;

a saw blade positioned around the first and second wheels and extending through the work table so as to be in a position for cutting the work piece;

a blade guide positioned in the work table and being removable therefrom, said blade guide including an integral blade guide extending portion that extends through and down from the work table, said blade running through the blade guide extending portion; and a tensioning assembly, said tensioning assembly including a tensioning device, a shaft member connected to the tensioning device and at least one spring, said spring being positioned on the at least one post member. said tensioning device having at least one opening extending therethrough, said post member extending through the at least one opening of the tensioning device so that the tensioning device is slidably secured to the housing, said first wheel being rotatably mounted on the shaft member and said spring being positioned between the tensioning device and the housing such that a radial force on the first wheel towards the table will cause the tensioning device to slidably move on the at least one post member against the bias of the spring, whereby the opening in the back panel allows a user to manually contact the tensioning device to force the tensioning device against the bias of the spring to move the first wheel towards the second wheel.

2. The band saw according to claim 1 wherein the blade guide includes a metal insert positioned within the blade guide extending portion such that the blade travels through the metal insert, said metal insert reducing wear on the blade guide.

3. The band saw according to claim 2 wherein the metal insert is made of a material selected from the group consisting of steel and brass.

4. A band saw for cutting a work piece, said band saw comprising:

a housing having an upper housing portion and a lower housing portion, said housing including a back panel, a side panel and a door panel, said door panel being totally secured to the side panel, said back panel having an opening therein and, housing further including at least one post member connected to the back panel at the periphery of the opening and extending within the opening of the back panel;

first and second wheels, said first wheel being rotatably mounted within the upper housing portion and said second wheel being rotatably mounted within the lower housing portion;

a work table secured to the lower housing portion;

a saw blade positioned around the first and second wheels and extending through the work table so as to be in a position for cutting the work piece;

a blade stabilizing and water feed device supported by said housing and positioned adjacent to the upper housing portion above the work table, said blade stabilizing and water feed device including an integral extended stabilizing portion, said blade running through the stabilizing portion of the blade stabilizing and water feed device, said blade stabilizing and water feed device being connected to a coolant reservoir such that coolant from the reservoir is applied to the stabilizing portion behind the blade to coat the blade from behind with coolant as it runs through the blade stabilizing and water feed device;and a tensioning assembly, said tensioning assembly including a tensioning device, a shaft member connected to the tensioning device and at least one spring, said spring being positioned on the at least one post member, said tensioning device having at least one opening extending therethrough, said post member extending through the at least one opening of the tensioning device so that the tensioning device is slidably secured to the housing, said first wheel being rotatably mounted on the shaft member and said spring being positioned between the tensioning device and the housing such that a radial force on the first wheel towards the table will cause the tensioning device to slidably move on the at least one post member against the bias of the spring, whereby the opening in the back panel allows a user to manually contact the tensioning device to force the tensioning device against the bias of the spring to move the first wheel towards the second wheel.

5. The band saw according to claim 4 wherein the stabilizing portion of the stabilizing and water feed device includes a metal insert, said blade traveling through the metal insert to reduce wear on the extended stabilizing portion.

6. A band saw for cutting a work piece, said band saw comprising:

a housing having an upper housing portion and a lower housing portion, said housing including a back panel, a side panel and a door panel, said door panel being pivotally secured to the side panel, said back panel having an opening therein and, said housing further including at least one post member connected to the back panel at the periphery of the opening and extending within the opening of the back panel;

first and second wheels, said first wheel being rotatably mounted within the upper housing portion and said second wheel being rotatably mounted within the lower housing portion;

a work table secured to the lower housing portion;

a saw blade positioned around the first and second wheels and extending through the work table so as to be in a position for cutting the work piece; and a tensioning assembly, said tensioning assembly including a tensioning device, a shaft member connected to the tensioning device and at least one spring, said spring being positioned on the at least one post member, said tensioning device having at least one opening extending therethrough, said post member extending through the at least one opening of the tensioning device so that the tensioning device is slidably secured to the housing, said first wheel being rotatably mounted on the shaft member and said spring being positioned between the tensioning device and the housing such that a radial force on the first wheel towards the table will cause the tensioning device to slidably move on the at least one post member against the bias of the spring, whereby the opening in the back panel allows a user to manually contact the tensioning device to force the tensioning device against the bias of the spring to move the first wheel towards the second wheel.

7. The band saw according to claim 6 further comprising an outlet port positioned at a lower area of the lower housing portion, said outlet port dispensing residue within the housing.

8. The band saw according to claim 6 wherein the tensioning device includes two of said openings and the housing includes two of said post members, wherein said post members and said tensioning device openings are rectangularly shaped, said tensioning assembly including two of said springs where one of said springs is positioned on each post member, wherein each post member extends through a respective one of said openings of the tensioning device so that said tensioning device is slidably secured to the housing.

9. The band saw according to claim 6 wherein the at least one post member includes an outer surface and the opening in the tensioning device includes an inner surface angled relative to the outer surface of the post member to allow the tensioning device to tilt relative to the post member.

10. The band saw according to claim 9 further comprising a blade tracking adjustment device, said blade tracking adjustment device being threadably engaged with the housing and being positioned against the tensioning device such that the tensioning device is tilted relative to the at least one post member against the angled wall causing the first wheel to tilt relative to the saw blade.

11. The band saw according to claim 6 wherein the back panel and the side panel are formed of a single molded plastic piece and the door panel is formed of a single molded plastic piece.

12. The band saw according to claim 6 wherein the first and second wheels are each single piece plastic wheels.

13. The band saw according to claim 6 wherein the tensioning device is a separate molded plastic piece, and wherein said shaft member is a plastic shaft member integral with the plastic tensioning device.

14. The band saw according to claim 13 wherein the tensioning device includes two of said opening, a base portion, a first wing portion and a second wing portion, the housing includes two of said post members, and the tensioning assembly includes two of said springs where one of said springs is positioned on each post member, and wherein the first wing portion includes one of said tensioning device openings extending therethrough receiving one of the post members and the second wing portion includes the other of said tensioning device openings extending therethrough receiving the other post member.

15. The band saw according to claim 6 wherein the at least one post member has a rectangular configuration and the at least one opening extending through the tensioning device has a rectangular configuration.

16. A band saw for cutting a work piece, said band saw comprising:
   a housing having an upper housing portion and a lower housing portion, said housing including a back panel, a side panel and a door panel, said door panel being pivotally secured to the side panel, said back panel having an opening therein and, said housing further including at least one post member connected to the back panel at the periphery of the opening and extending within the opening of the back panel;
   first and second wheels, said first wheel being rotatably mounted within the upper housing portion and said second wheel being rotatably mounted within the lower housing portion;
   a work table secured to the lower housing portion;
   a saw blade positioned around the first and second wheels and extending through the work table so as to be in a position for cutting the work piece;
   an electric motor secured to the back panel at the lower housing portion, said second wheel being mounted to a shaft of the motor, said motor being secured to the back panel at an angle thereto such that the motor shaft is angled downwards and the second wheel tilts relative to the motion of the saw blade, and
   a tensioning assembly, said tensioning assembly including a tensioning device, a shaft member connected to the tensioning device and at least one spring, said spring being positioned on the at least one post member, said tensioning device having at least one opening extending therethrough, said post member extending through the at least one opening of the tensioning device so that the tensioning device is slidably secured to the housing, said first wheel being rotatably mounted on the shaft member and said spring being positioned between the tensioning device and the housing such that a radial force on the first wheel towards the table will cause the tensioning device to slidably move on the at least one post member against the bias of the spring, whereby the opening in the back panel allows a user to manually contact the tensioning device to force the tensioning device against the bias of the spring to move the first wheel towards the second wheel.

17. The band saw according to claim 16 wherein the electric motor is tilted relative to the back wall of the lower housing portion at an angle between about 3° to about 50°.

18. A band saw for cutting a work piece, said band saw comprising:
   a housing having an upper housing portion and a lower housing portion, said housing including a back panel, a side panel and a door panel, said door panel being pivotally secured to the side panel, said housing further including at least one post member connected to the back panel;
   first and second wheels, said first wheel being rotatably mounted within the upper housing portion and said second wheel being rotatably mounted within the lower housing portion;
   a work table secured to the lower housing portion;
   a saw blade positioned around the first and second wheels and extending through the work table so as to be in a position for cutting the work piece;
   a tensioning assembly, said tensioning assembly including a tensioning device, a shaft member connected to the tensioning device and at least one spring, said first wheel being rotatably mounted on the shaft member, said spring being positioned on the at least one post member, said tensioning device having at least one opening extending therethrough, said post member extending through the at least one opening of the tensioning device so that the tensioning device is slidably secured to the housing, wherein the at least one post member includes an outer surface and the opening extending through the tensioning device includes an inner surface wherein one end of the tensioning device opening is narrower than an opposite end of the tensioning device opening so that the inner surface is angled relative to the outer surface of the post member, and
   a blade tracking adjustment device, said blade tracking adjustment device being connected to the housing and being positioned against the tensioning device such that actuation of the blade tracking adjustment device causes the angled inner surface to be adjusted relative to the outer surface of the post member so that the tensioning device is tilted relative to the at least one post member causing the first wheel to tilt relative to the saw blade.

19. The band saw according to claim 18 wherein the tensioning device includes two of said openings and the housing includes two of said post members, wherein said post members and said tensioning device openings are rectangularly shaped, said tensioning assembly including two of said springs where one of said springs is positioned on each post member, wherein each post member extends through a respective one of said openings of the tensioning device so that said tensioning device is slidably secured to the housing.

20. The band saw according to claim 18 wherein the back panel has an opening therein, and wherein the at least one post member is positioned within the opening to allow a user to manually contact the tensioning device to force the tensioning device against the bias of the spring to move the first wheel towards the second wheel.

21. The band saw according to claim 18 wherein the back panel and the side panel are formed of a single molded plastic piece, the door panel is formed of a single molded plastic piece, the tensioning device is formed of a separate molded plastic piece, and the first and second wheels are each single piece plastic wheels.

22. The band saw according to claim 18 wherein the tensioning device includes two of said opening a base portion, a first wing portion and a second wing portion, the housing includes two of said post members, and the tensioning assembly includes two of said springs where one of said springs is positioned on each post member, and wherein the first wing portion has one of said tensioning device openings extending therethrough receiving one of the post members and the second wing portion includes the other of said tensioning device openings extending therethrough receiving the other post member.

23. The band saw according to claim 18 wherein the at least one post member has a rectangular configuration and the at least one opening extending through the tensioning device has a rectangular configuration, said outer surface being a wall of the post member and said inner surface being a wall of the opening.

\* \* \* \* \*

UNITED STATES PATENT AND TRADEMARK OFFICE
CERTIFICATE OF CORRECTION

PATENT NO. : 5,802,939
DATED : September 8, 1998
INVENTOR(S) : Wiand et al.

It is certified that error appears in the above-identified patent and that said Letters Patent is hereby corrected as shown below:

Column 7, line 51, Claim 4, "totally" should be --pivotally--.
Column 7, line 52, Claim 4, "and, housing" should be -- ,and said housing--
Column 9, line 40, Claim 14, "opening" should be --openings--.
Column 12, line 6, Claim 22, "opening a" should be --openings, a--.

Signed and Sealed this

Twenty-second Day of February, 2000

Attest:

Q. TODD DICKINSON

Attesting Officer

Commissioner of Patents and Trademarks